United States Patent
Marton

(10) Patent No.: US 7,822,194 B2
(45) Date of Patent: Oct. 26, 2010

(54) METHOD AND SYSTEM FOR LOW DELAY ECHO CANCELLING

(75) Inventor: Trygve Frederik Marton, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1122 days.

(21) Appl. No.: 11/486,411

(22) Filed: Jul. 13, 2006

(65) Prior Publication Data

US 2007/0071254 A1    Mar. 29, 2007

(30) Foreign Application Priority Data

Jul. 13, 2005    (NO) ................................. 20053393

(51) Int. Cl.
*H04M 9/08*    (2006.01)

(52) U.S. Cl. .................. 379/406.14; 725/149

(58) Field of Classification Search ................. 725/149; 379/406.01, 406.02, 406.03, 406.06, 406.14
See application file for complete search history.

(56) References Cited

U.S. PATENT DOCUMENTS

| 5,014,232 | A | 5/1991 | André |
| 2004/0088742 | A1* | 5/2004 | LeBlanc et al. ............ 725/149 |
| 2004/0161101 | A1 | 8/2004 | Yiu et al. |

FOREIGN PATENT DOCUMENTS

| EP | 0746133 A2 | 12/1996 |
| WO | WO 2005062595 A1 | 7/2005 |

* cited by examiner

*Primary Examiner*—Fan Tsang
*Assistant Examiner*—Simon King
(74) *Attorney, Agent, or Firm*—Oblon, Spivak, McClelland, Maier & Neustadt, L.L.P.

(57) ABSTRACT

The present invention relates to an audio communication system and method with improved acoustic characteristics. It combines the benefits from full band echo cancellers and sub-band echo cancellers, by merging the filter taps of sub-band filters into the respective full-band filter taps, which is being used to generate the inverted echo estimate in the echo canceller.

8 Claims, 8 Drawing Sheets

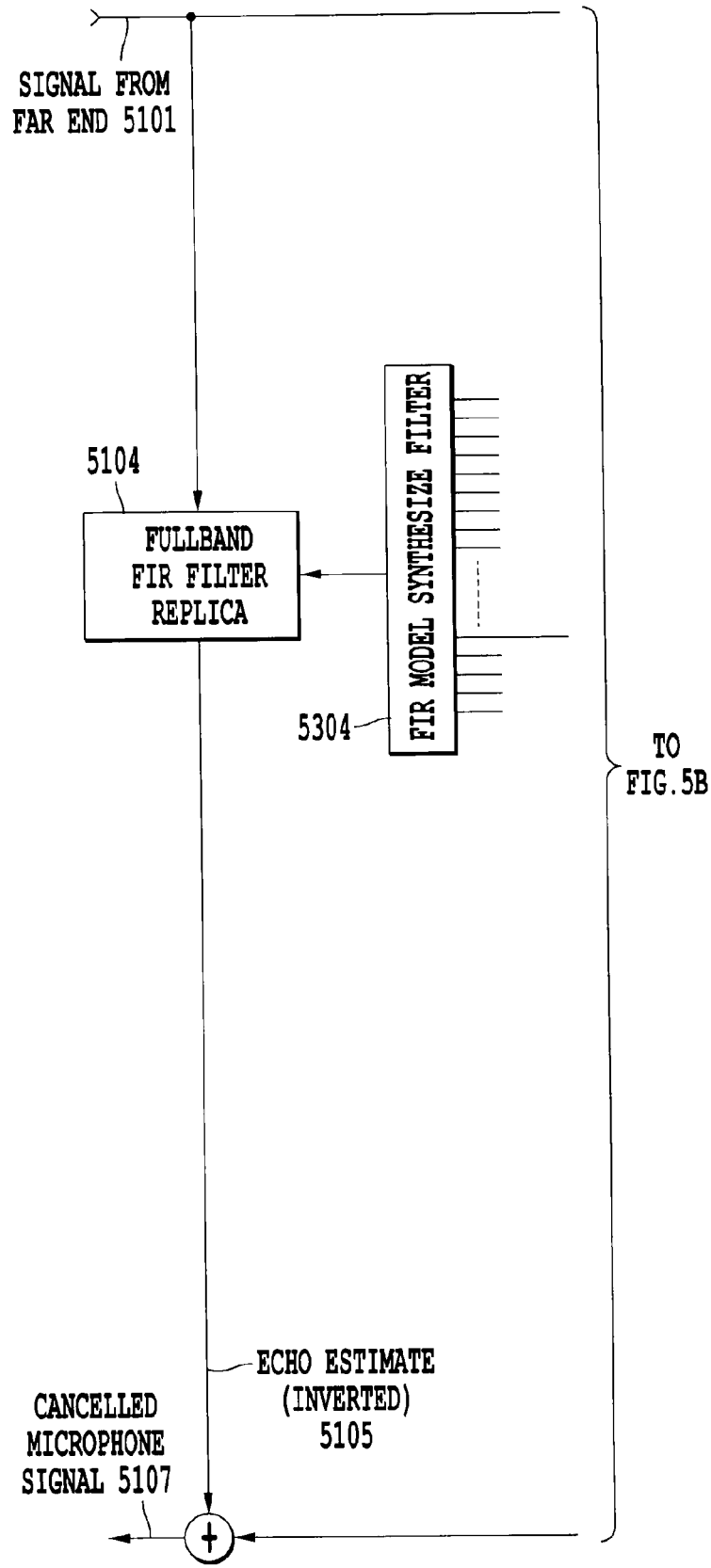

METHOD AND SYSTEM FOR LOW DELAY ECHO CANCELLING

RELATED APPLICATION

This application claims priority under 35 U.S.C. §119 or 365 to Norwegian Application No. 20053393, filed Jul. 13, 2005. The entire teachings of the above application are incorporated herein by reference.

BACKGROUND

In a conventional conferencing system, one or more microphones capture a sound wave at a far end site, and transforms the sound wave into a first audio signal. The first audio signal is transmitted to a near end site, where a television set or an amplifier and loudspeaker reproduces the original sound wave by converting the first audio signal generated at the far end site into the sound wave. The produced sound wave at the near end site is captured partially by the audio capturing system at the near end site, converted to a second audio signal, and transmitted back to the system at the far end site. This problem of having a sound wave captured at one site, transmitted to another site, and then transmitted back to the initial site is referred to as acoustic echo. In its most severe manifestation, the acoustic echo might cause feedback sound when the loop gain exceeds unity. The acoustic echo also causes the participants at both sites to hear themselves, making a conversation over the conferencing system difficult.

The echo problem is further described in reference to FIG. 1. A digital audio signal from far end 1101 is converted into the analog domain by the digital to analog converter (DAC) 1301, amplified in the loudspeaker amplifier 1302 and further converted to acoustic signals by the loudspeaker 1303. Both the direct signal 1304 and reflected versions 1306, reflected by walls/ceilings etc. 1305 are undesirably picked up by the microphone 1308. The microphone also picks up the desired near end signal 1307. The microphone signal is amplified in the microphone amplifier 1309 and digitized in the analog to digital converter 1310, outputting the uncancelled microphone signal 1202.

If the uncancelled microphone signal were transmitted to the far end, the far end site would hear echo of themselves, and if a similar system was present at the far end, even howling/feedback might have occurred.

The common way to solve this problem is to add the acoustic echo canceller 1203 to the microphone signal path. This canceller uses the digital loudspeaker signal as a signal reference, and estimates all of the loudspeaker to microphone paths 1304/1306, and subtracts these estimates from the uncancelled microphone signal 1202, making the cancelled microphone signal 1204, which is transmitted to the far end as signal 1102.

According to prior art there are two main approaches for acoustic echo cancellers. The first one is a full band canceller, and the second one is a sub band canceller. Both of these normally use adaptive FIR (finite impulse response) filters for the echo path estimating, however applying these in full band domain and sub band domain, respectively.

An acoustic echo canceller used will typically include several additional sub blocks e.g. double talk algorithm, non-linear processing unit, comfort noise generation, etc. For simplicity and perspicacity, these sub blocks are not discussed here, as these blocks are not directly relevant to the scope of the invention. These blocks may vary and are well documented in prior art. For one skilled in the art, the integrating of these blocks is straightforward.

FIG. 2 shows a prior art full band acoustic echo canceller. The signal from far end 2101 is passed to the loudspeaker as signal 2102 and is also used as the loudspeaker reference signal 2103.

The loudspeaker reference signal 2103 is filtered through the adaptive FIR filter 2104. This adaptive filter converges to and tracks the impulse response of the room. For the initial convergence, and to adjust for any acoustic changes in the room (door opens, people move, etc.), the adaptive FIR filter 2104 has to be adaptive. Many different adaptive algorithms can be used for this purpose, from the inexpensive (low processing power) LMS (least mean square) to more sophisticated and more expensive algorithms as APA (affine projection algorithm) and RLS (recursive least squares). However, in common, all these algorithms use the FIR filter update loop 2108 for adapting. The adaptive FIR filter outputs an inverted echo estimate 2105, which is added to the uncancelled microphone signal 2106, calculating the echo cancelled microphone signal 2107.

In a full band echo canceller, no algorithmic delay is added to the microphone signal path, and therefore full band cancellers are often used when short delay is a requirement.

However, there are some disadvantages with the prior art full band canceller. One disadvantage is that the adaptive filter's ability to track changes in the acoustic environment is poor/slow, especially for speech and other natural (coloured) signals. Another disadvantage is that the processing power requirements tend to be exhaustive, as explained in the following.

The model of the acoustic system used in most echo cancellers is a FIR filter. FIR filters are well known in the art of signal processing, and the basics of which will not be discussed here. The FIR filter approximates the transfer function of the direct sound and most of the reflections in the room. Due to processing power requirements, the FIR filter will not try to cancel echo in an infinite time after the signal was played on the loudspeaker. Instead, it will accept that the echo after a given time, the so-called tail length, will not be cancelled, but will appear as residual echo.

To estimate the echo in the complete tail length, the required length of the FIR filter will be:

$$L = Fs * \text{tail length},$$

where Fs is the sampling frequency in Hz, and the tail length is given in seconds.

The required number of each of multiplications and additions to calculate one single sample output of the filter equals the filter length, and the output of the filter should be calculated once per sample. Consequently, the total number of multiplications and additions are:

$$Fs * L = Fs * Fs * \text{taillength} = \text{taillength} * FS^2$$

A typical value for the tail length is 0.25 sec. The number of multiplications and additions will be 16 Million for a system using a sampling frequency of 8 kHz, 64 Million for 16 kHz and 576 Million for 48 kHz.

Similar calculations can be performed for the filter update algorithm. The simplest algorithm, LMS, has the same number of additions and multiplications as the FIR filter, so for the absolute simplest full band canceller, the number of additions and multiplications each equals:

$$2 * \text{taillength} * Fs^2.$$

More complex update algorithms improve the tracking ability of the FIR filter, but are even more complex in terms of processing power. There exists algorithms having a complexity proportional to the filter length, but with a proportional constant much higher than the LMS algorithm, and even algorithms with a complexity proportional to the square of the filter length. The last case gives a processing power requirement for a full band echo canceller proportional to $Fs*(Fs*taillength)^2$, which is unrealistic for full band acoustic echo cancellers.

The conventional way of overcoming the two disadvantages of a full band echo canceller discussed above is to introduce sub-band processing. In FIG. 3, one approach to this is shown, which will be discussed in the following.

The signal from the far end 3101 is passed to the loudspeaker as signal 3102. It is also divided into a chosen number sub-bands using the analyze filter 3301. The uncancelled microphone 3106 is divided into sub-bands using another (but equal) analyze filter 3302. The chosen number of sub-bands is hereafter denoted N.

For each sub-band, the loudspeaker analyze filter outputs a sub-band reference signal 3203, which is filtered through a sub-band FIR filter 3204, calculating an inverted sub-band echo estimate 3205. The microphone analyze filter outputs a sub-band uncancelled signal 3206, which is added to the inverted echo estimate, outputting a sub-band echo cancelled microphone signal 3207. The echo cancelled microphone signal is used for adapting the FIR filter, shown as the sub-band FIR filter update loop 3208.

The echo cancelled microphone signals from all sub-bands are also merged together to a full band cancelled microphone signal 3107 by the synthesize filter 3303. Using this approach, the signal is divided into bands with smaller bandwidth, which can be represented using a lower sampling frequency, which will follow from the discussion below. Note that the analyze filter consists of a filter bank and a decimator, while the synthesize filter consists of a filter bank and an interpolator.

According to Nyquist's sampling theorem, the sampling frequency of the full band signal will be calculated as follows:

$$Fs_{fullband} = 2 * F_{fullband}$$

where $F_{fullband}$ is the full band frequency band. Similarly, the sampling frequency of the sub-band signal can be calculated as:

$$Fs_{subband} = 2 * F_{subband}$$

where $F_{subband}$ is the sub-band frequency band. Moreover, the frequency band of each sub-band can be expressed as follows:

$$F_{subband} = F_{fullband} / N$$

Further, to simplify and reduce the processing power requirements of a filter bank, oversampling is conventionally being used. This can be expressed mathematically by introducing a constant, which of course can include all other constants added in the expression.

From the expressions above, it follows that the sub-band signals will have a sampling frequency of:

$$Fs_{subband} = (K/N) * Fs_{fullband}.$$

where K is the oversampling factor. K is always higher than one, but most often relatively small, typically less than two.

Assuming a FIR filter with an adoption of a complexity proportional to the filter length (for example LMS), the required processing power for the filtering and adoption in one sub-band can be expressed as:

$$PROSPow_{subband} = C_1 * taillength * Fs_{subband}^2$$

$$PROSPow_{subband} = C_1 * taillength * (K/N * Fs_{fullband})^2$$

where $C_1$ is a proportionally constant.

Consequently, for all N sub-bands the required processing power equals:

$$ProsPow = N * C_1 * taillength * (K/N * Fs_{fullband})^2$$

$$ProsPow = C_1 * taillength * (K * Fs_{fullband})^2 / N$$

Thus, for a high N, the processing power requirements of the filtering can be drastically reduced. Of course, the overhead of the analyze and synthesize filters must be added, but for high tail lengths and reasonably high N, this overhead is small compared to the savings described.

For more sophisticated update algorithms with complexity proportional to the square of the filter length, the complexity reduction compared to the full band case is even higher, due to the significantly lower filter length.

In addition, experience has shown that sub-band cancellers have an improved ability to adapt to changes in the acoustic environment, especially for speech and other natural (coloured) signals.

However, one major disadvantage is introduced in the sub-band scheme. The analyze and synthesize filters add algorithmic delay to the microphone signal. In some applications, this is undesirable or even unacceptable.

In summary, the strength and weaknesses of the two presented approaches are inverted. While the full band echo canceller benefits from zero algorithmic delay, it suffers from slow adaptation and high processing complexity. The sub-band echo canceller, however, benefits from faster adaptation and lower processing complexity, but suffers from an algorithmic delay.

SUMMARY

The present invention relates to an audio communication system and method with improved acoustic characteristics, and particularly to a conferencing system including an improved audio echo cancellation system.

It is an object of the present invention to provide a method and a system for audio echo cancelling overcoming the problems described above.

In particular, the present invention discloses an audio echo canceller adjusted to provide an echo attenuated output signal (5107) from an echo added microphone signal (5106) consisting of a near-end audio signal and a far-end audio signal (5101) originated echo signal by adding an inverted echo estimate (5105), generated by filtering the far-end audio signal (5101) with a full band FIR filter (5104) including a set of fill band filter taps, the audio echo canceller further includes a first analyze filter (5301) configured to divide the far-end audio signal (5101) into a number of sub-band reference signals (5203), a second analyze filter configured to divide the echo added microphone signal (5106) into a number of sub-band echo added microphone signals (5206), a number of sub-band FIR filters including respective sets of sub-band filter taps, each sub-band FIR filter configured to filter an associated sub-band reference signals (5203) and output an inverted sub-band echo estimate (5205) being added to an associated sub-band echo added microphone signal (5206) to provide a sub-band echo attenuated feedback signal (5207), with which an associated set of sub-band filter taps are updated, and a first synthesize filter configured to merge corresponding sub-band filter taps from said sets of sub-band filter taps to corresponding full band filter taps being passed to the full band FIR filter (5104). The invention also discloses a corresponding method.

BRIEF DESCRIPTION OF THE DRAWINGS

FIGS. 5A and 5B (hereinafter referred to as FIG. 5) show a block diagram of a first embodiment of the present invention.

DETAILED DESCRIPTION

The present invention maintains the fast adaptation from sub-band echo cancellers and the zero delay from the full band canceller. It adds a little to the processing power requirements, but is still much closer to the low processing power requirements of a conventional sub-band echo canceller compared to a conventional full band echo canceller, especially when complex and sophisticated adaptation algorithms are involved.

In order to describe the present invention, the prior art system of FIG. 3 will now be described in more detail referring to FIG. 4, which illustrates a more detailed version of the system.

Figure 1:
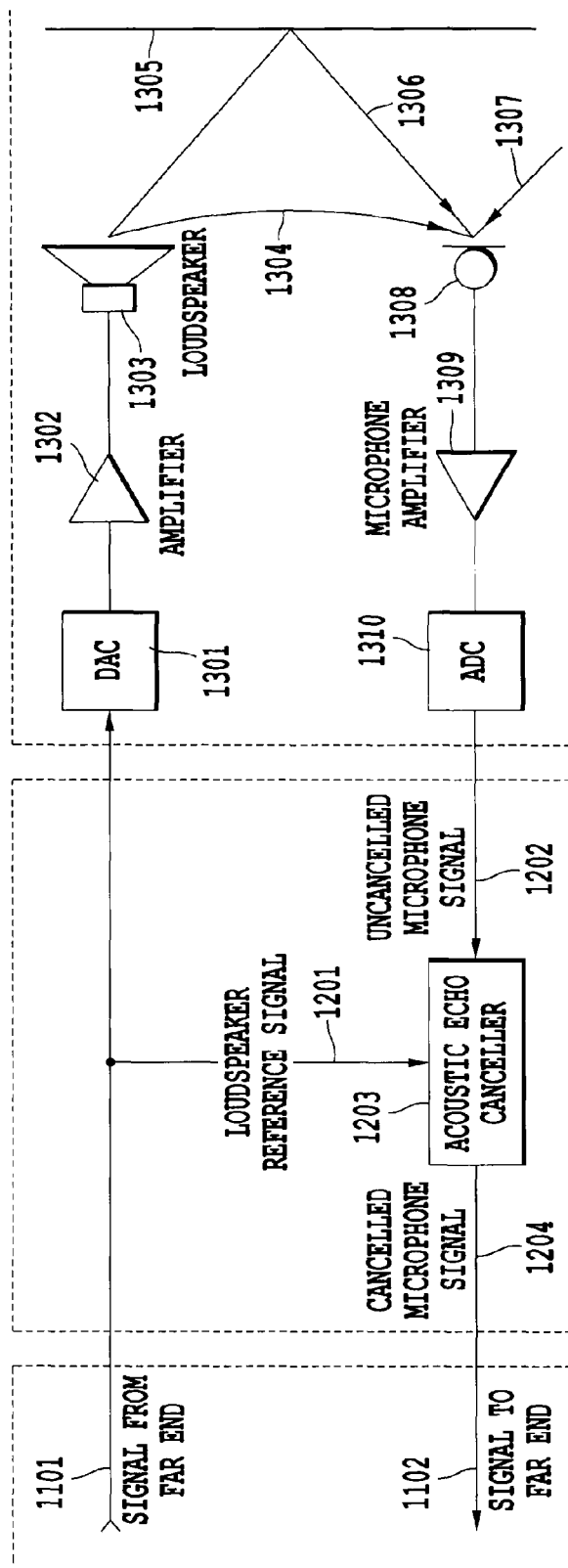
FIG. 1 is a detailed block diagram of a conventional conferencing system set-up.
Figure 2:
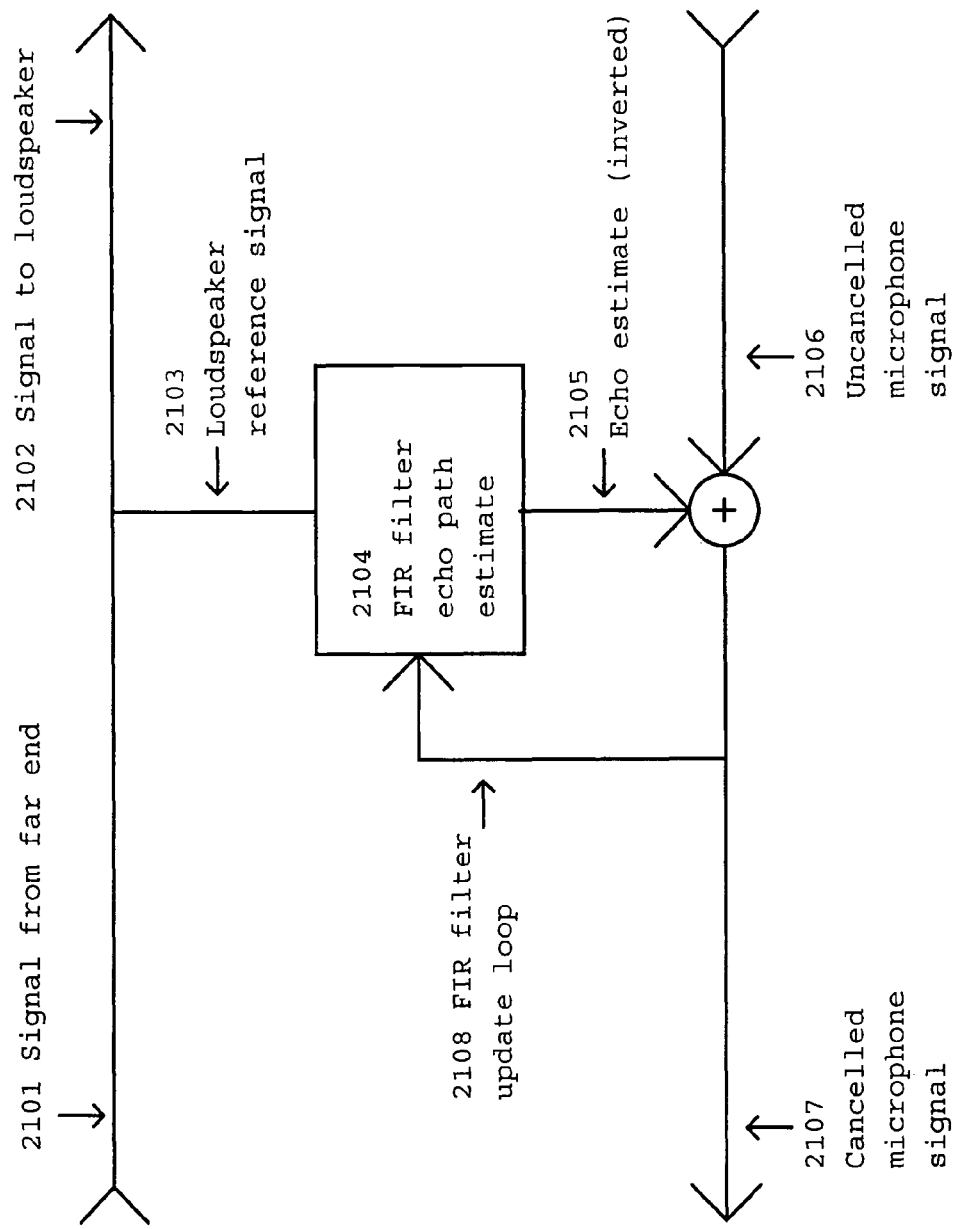
FIG. 2 is a closer view of an acoustic echo canceller subsystem with full-band processing.
Figure 3:
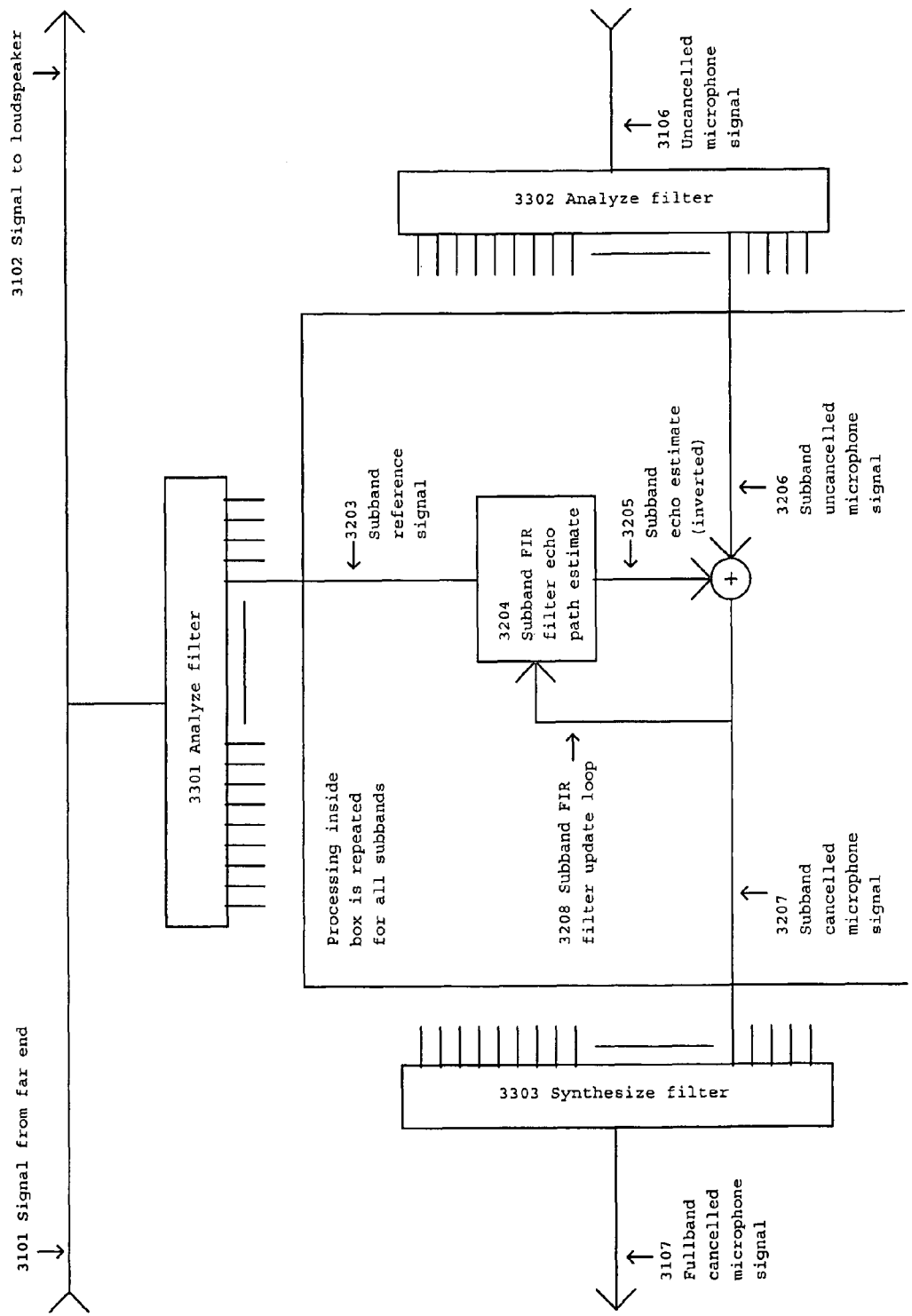
FIG. 3 is a block diagram of the corresponding echo canceller subsystem implemented with sub-band processing.
Figure 4:
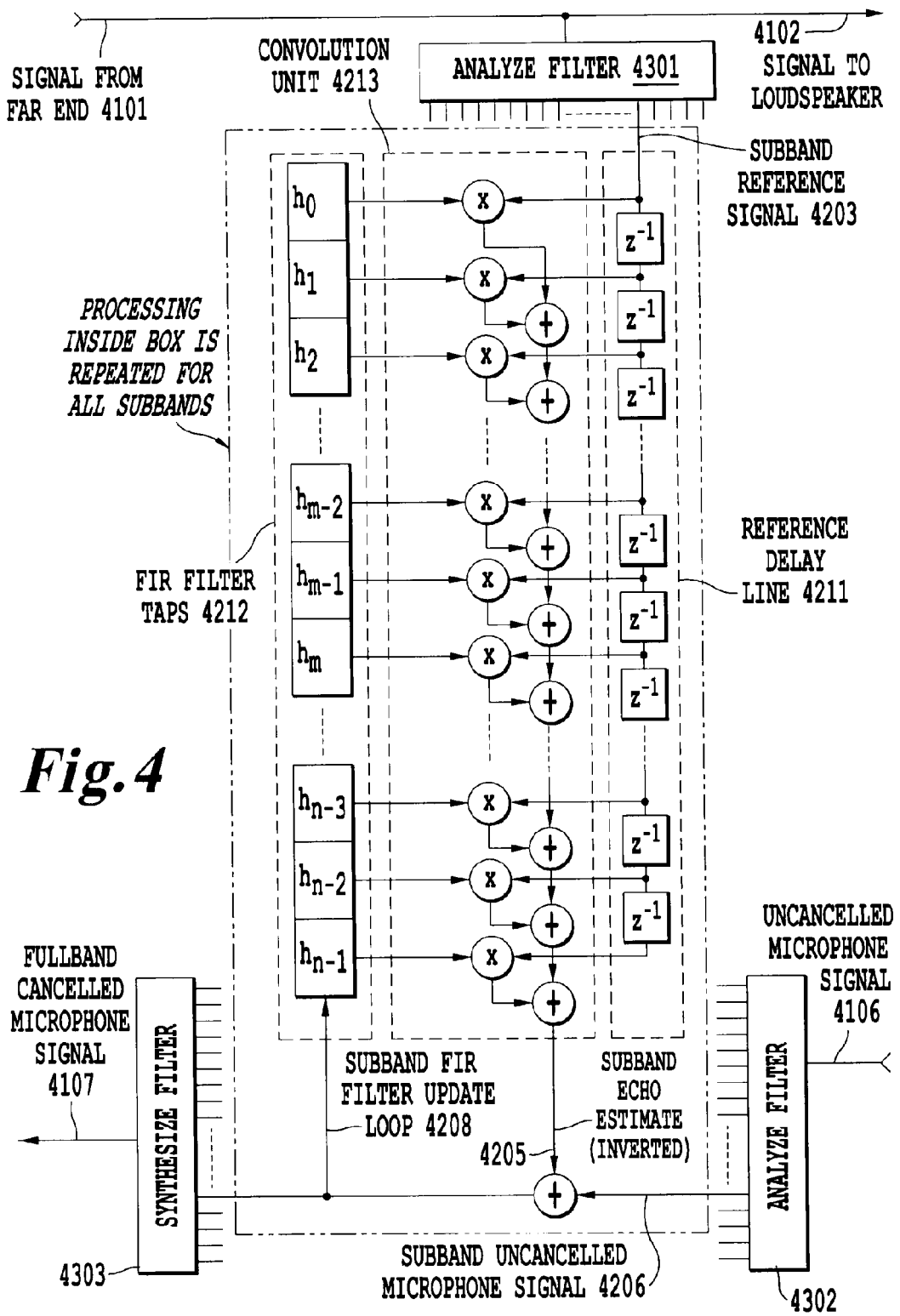
FIG. 4 is a block diagram of the sub-band system with a closer view at the sub-band FIR filter.

As in FIG. 3, the signal from the far end 4101 is passed to the loudspeaker as signal 4102. It is also divided into sub-bands using the analyze filter 4301. The uncancelled microphone signal 4106 is divided into sub-bands using another (but equal) analyze filter 4302.

For each sub-band, the loudspeaker analyze filter outputs a sub-band reference signal 4203, which is filtered through a sub-band FIR filter, consisting of a reference delay line 4211, a set of FIR filter taps 4212 and a convolution unit 4213. The convolution unit outputs an inverted sub-band echo estimate 4205. The microphone analyze filter outputs a sub-band uncancelled signal 4206, which is added to the inverted echo estimate, outputting a sub-band echo cancelled microphone signal 4207. The echo cancelled microphone signal is used for the adapting of the FIR filter, shown as the sub-band FIR filter update loop 4208.

The echo cancelled microphone signals from all sub-bands are also merged together to a microphone cancelled full band signal 4107 by the synthesize filter 4303.

Figure 5B:
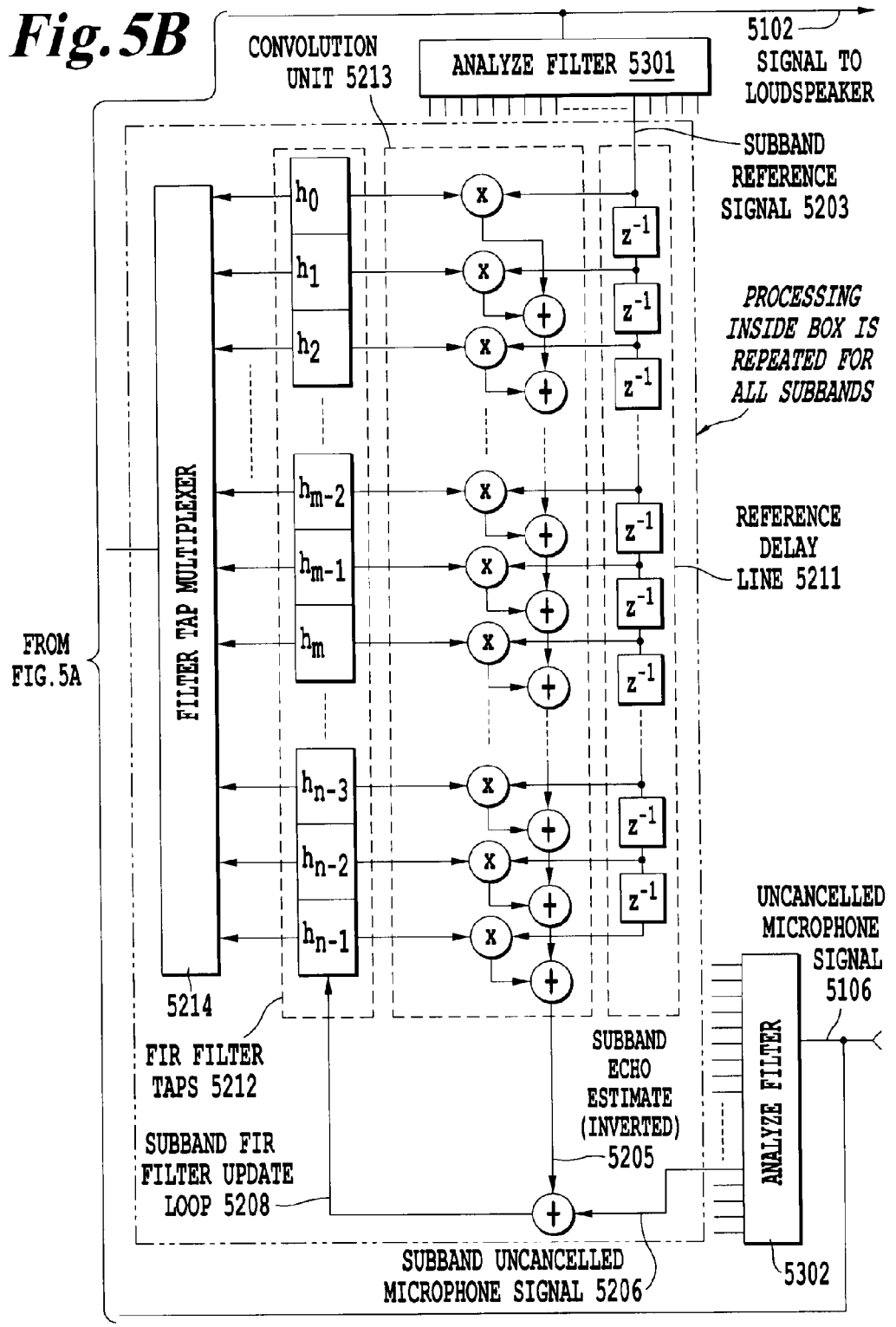

FIG. 5 illustrates a first embodiment of the present invention. As in the prior art system of FIG. 4, the signal from the far end 5101 is passed to the loudspeaker as signal 5102. It is also divided into sub-bands using the analyze filter 5301. The uncancelled microphone signal 5106 is divided into sub-bands using another (but equal) analyze filter 5302.

For each sub-band, the loudspeaker analyze filter outputs a sub-band reference signal 5203, which is filtered through a sub-band FIR filter, consisting of a reference delay line 5211, a set of FIR filter taps 5212 and a convolution unit 5213. The convolution unit outputs an inverted sub-band echo estimate 5205. The microphone analyze filter outputs a sub-band uncancelled signal 5206, which is added to the inverted echo estimate, outputting a sub-band echo cancelled microphone signal 5207. As with the prior art system of in FIG. 4, the echo cancelled microphone signal is used for the adapting of the FIR filter, shown as the sub-band FIR filter update loop 5208. However, different from prior art, the sub-band echo cancelled microphone signal is not passed through a synthesize filter.

Instead, the filter tap values of the FIR filter are sequentially passed through a FIR model synthesize filter 5304 to calculate a full band FIR filter replica 5104. A filter tap multiplexer 5214 controls the sequencing. First the synthesize filter are reset to an all zero state, thereafter the filter tap values of the sub band FIR filters are fed to the synthesize filter, starting with the $h_0$ taps from all sub bands, thereafter the $h_1$ taps from and so on, finishing with the $h_{n-1}$ taps of all sub bands. Here, n is the number of taps in the sub band FIR filters. In sub band echo cancellers, it is common to use different number of taps for different sub bands, and in such a case, the filter tap multiplexer will output zero for all sub bands where no more taps are present.

Consequently, some passes with all zeros are passed through the synthesize filter, due to the delay and length of response in the synthesize filter, calculate the tail of the response. The required number of passes will depend on the synthesize filter design. Finally, the output of the synthesize filter is copied to the FIR filter replica 5104. The result is that the full band FIR filter is made up of FIR taps generated from the FIR taps of the respective sub-bands.

Several approaches on how and when to pass the sub-band FIR filter taps through the synthesize filter is possible. All sequencing could be performed atomically (at one point of time), but this will add unnecessary much processing power. A more preferred solution is to pass one set of taps through the synthesize filter each sample interval. This implies that the full band filter is only updated at an interval a little higher than the tail length chosen, but this is rather insignificant, as the sub band filters are fairly constant. Even when the acoustic response changes, the re-adaption time will be high compared to the tail length/update interval.

Further, the signal from the far end 5101, identical to the signal to the loudspeaker 5102, is passed through the full band FIR filter replica 5104, making an inverted full band echo estimate 5105. This is added to the uncancelled microphone signal 5106, making the echo cancelled full band microphone signal 5107.

Using this approach, zero algorithmic delay is achieved, as the microphone signal is not exposed to signal processing. All adaptations are performed in sub-band, and benefits from the sub-band echo canceller are maintained.

However, the full band echo filtering has to be made twice, once in the sub-band domain (computationally inexpensive) and once in the full band domain (computationally expensive). Thus, even though the processing power requirements are considerably lower than the full band case, they are high compared to the pure sub-band approach, and further reductions are desired.

Figure 6A:
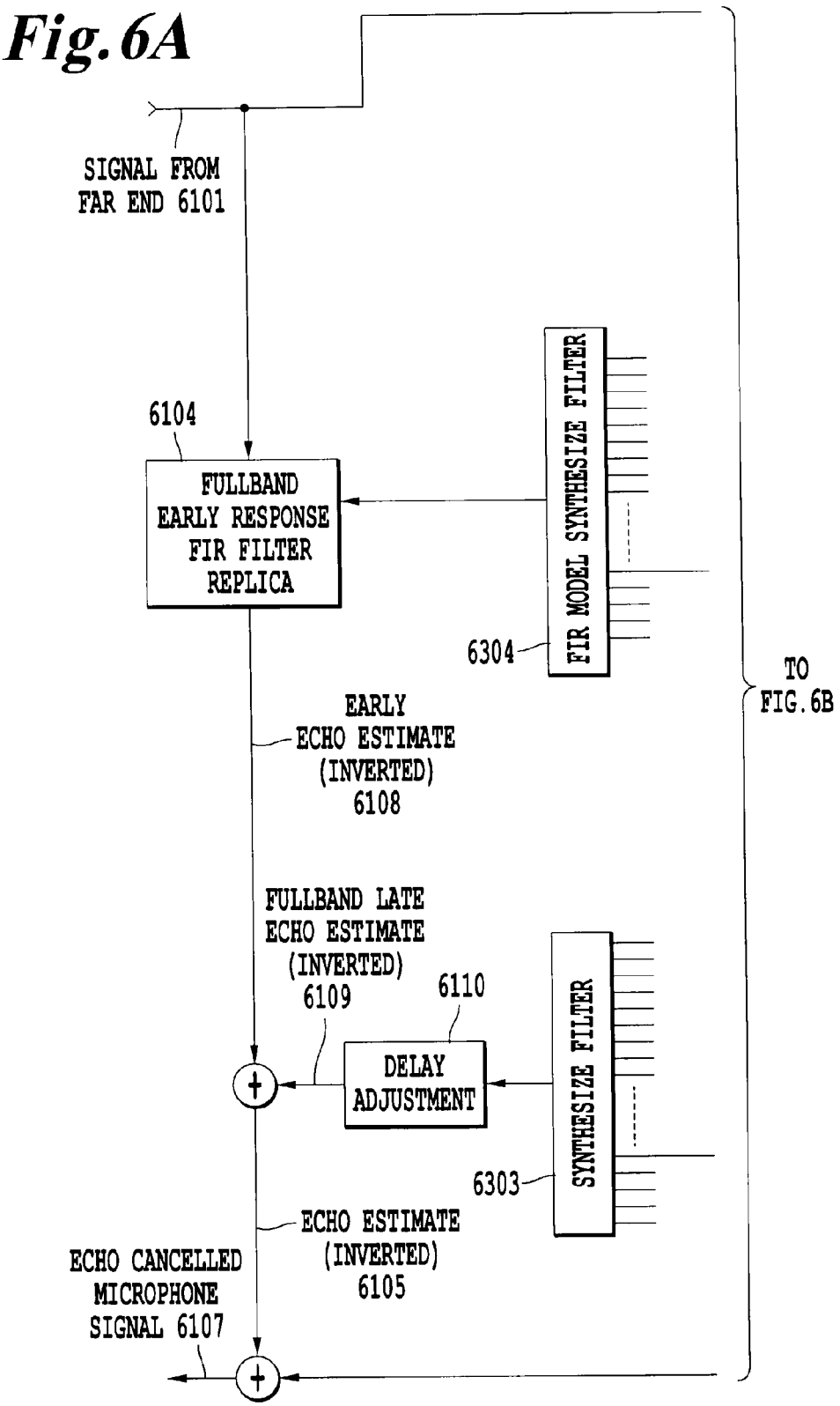
FIGS. 6A and 6B (hereinafter referred to as FIG. 6) show a block diagram of a second embodiment of the present invention.
Figure 6B:
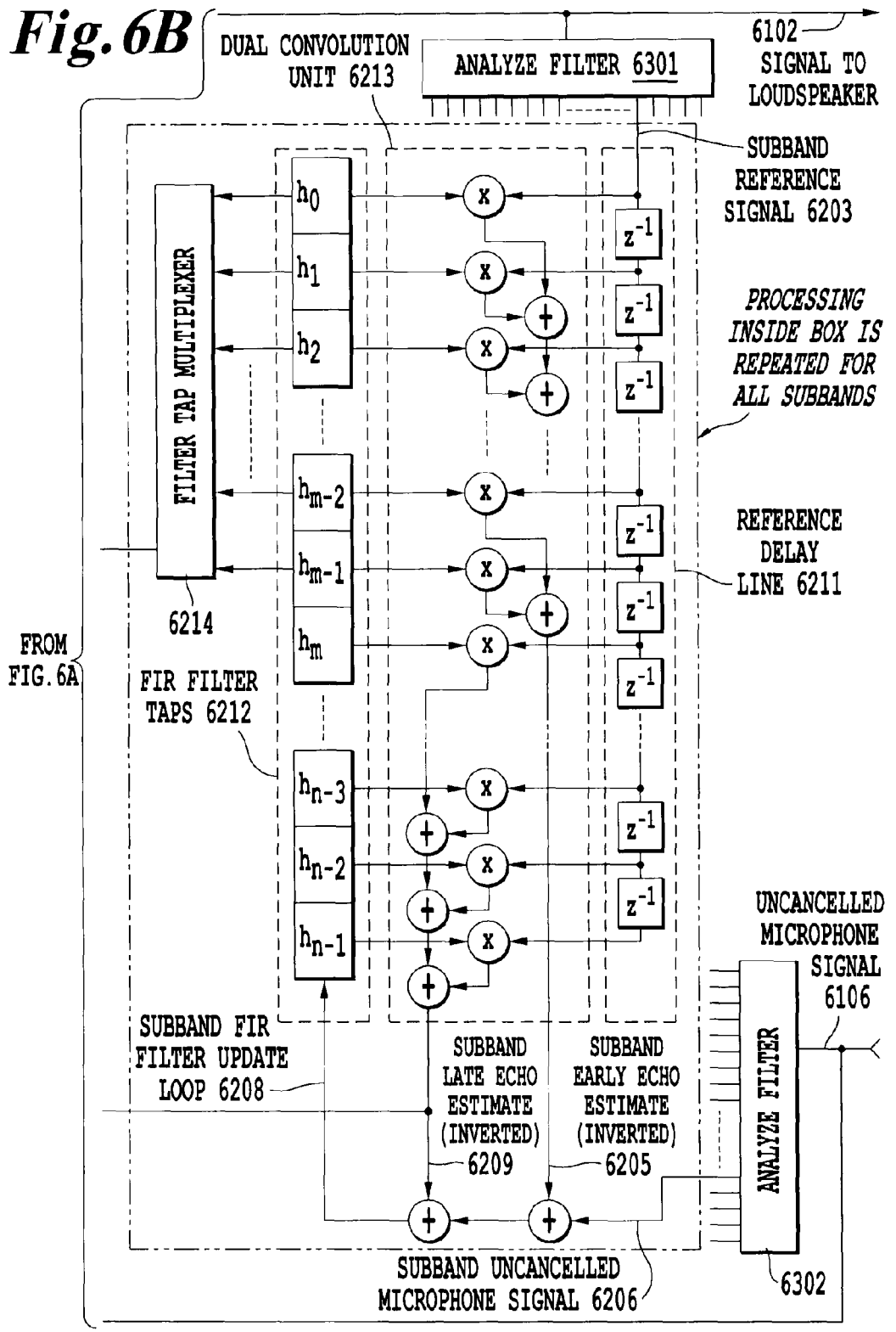

In a second embodiment of the present invention, the processing power requirements are lowered. This embodiment is illustrated in FIG. 6.

Again, the signal from the far end 6101 is passed to the loudspeaker as signal 6102. It is also divided into sub-bands using the analyze filter 6301. The uncancelled microphone signal 6106 is divided into sub-bands using another (but similar) analyze filter 6302.

For each sub-band, the loudspeaker analyze filter outputs a sub-band reference signal 6203, which is filtered through a dual sub-band FIR filter, consisting of a reference delay line 6211, a set of FIR filter taps 6212 and a dual convolution unit 6213. The convolution unit outputs an inverted sub-band early echo estimate 6205 and an inverted late echo estimate 6209. The sub-band early echo estimate is the first part of the sub-band echo estimate in time, determined by the filter taps $h_0$-$h_{m-1}$, while the sub-band late echo estimate is the last part of the sub-band echo estimate in time, determined by the filter taps $h_m$-$h_n$. The microphone analyze filter outputs a sub-band uncancelled signal 6206, which is added to both the inverted echo estimates, outputting a sub-band echo cancelled microphone signal 6207.

As in FIG. 5, the echo cancelled microphone signal is used for the adapting of the FIR filter, shown as the sub-band FIR filter update loop 6208. The adaptation of the FIR filter is identical as in FIG. 5.

As in FIG. 5, a filter tap multiplexer 6214 and a FIR model synthesize filter 6304 calculates a full band response filter replica 6104. However, this replica is only calculated using early part of the estimated sub-band FIR filter responses, and the full band replica only represent the early part of the acoustic response. Thus, the full band FIR filter replica 6104 is considerably shorter than the replica in FIG. 5. The full band reference signal 6101 is passed through this filter, outputting an inverted full band early echo estimate 6108.

In addition, the inverted sub-band late echo estimate is passed through a late echo synthesize filter 6303, forming an inverted full band late echo estimate 6109. Note that it is a late echo estimate and not an echo reduced signal (as in FIG. 4) which is passed through the synthesize filter. For balancing the delay through the analyze and synthesize filter, a delay adjustment 6110 might be required just after the synthesize filter 6303.

The full band early echo estimate 6104 and the full band late echo estimate 6109 are added, forming the full band echo estimate 6105. The full band echo estimate is added to the uncancelled microphone signal 6106, outputting an echo cancelled microphone signal.

Basically, the approach of the second embodiment only estimates the first part of the echo using a full band FIR filter, while the late part of the echo, which is delayed anyway, allows for calculation with the inherent delays introduced by the sub band structure, without introducing any algorithmic delay in the microphone signal path. Since the full band early response filter replica is considerably shorter than the replica in FIG. 5, a complexity reduction is achieved.

The number of filter taps which can be used for the early echo and for the late echo, depends on the design of the analyze and synthesize filter. Depending on this design, there may also be some overlap between the echo estimate contribution from the full band FIR filter and from the sub band late echo model. As an example, assume that the analyze and synthesize filter introduces 40 ms of algorithmic delay, while the system needs to cancel 250 ms tail length. Typically, the early echo full band FIR filter then needs to be somewhat longer than the 40 ms delay. The first 40 ms are cancelled solely by the full band filter, the next, e.g. 10 ms are jointly cancelled by the full band FIR filter and the late echo estimate, while the last 200 ms are cancelled solely by the late echo estimate. In this example, the processing power requirement for the full band filter is reduced by 80% compared to the embodiment illustrated in FIG. 5. The net improvement is not that big, as another synthesize filter is necessary. However, compared to the first embodiment, for the same update interval of the full band FIR filter, the computationally complexity of the FIR model synthesize filter can be reduced, due to fewer sets of taps which must be passed.

The present invention combines the benefits from full band echo cancellers and subband echo cancellers, without introducing the disadvantages.

By the present invention, there will be zero algorithmic delay in the microphone path, which is the case in full band cancellers, opposed to the inherent delay of sub-band cancellers.

Further, the adaptation/convergence speed equal to sub-band echo canceller, as adaptation is performed in sub-band, as opposed to the slow convergence speed of full-band echo cancellers, especially for speech and natural signals. Finally, the present invention requires low computational complexity, close to the sub-band echo canceller, as opposed to the high computationally complexity of full band cancellers.

While this invention has been particularly shown and described with references to preferred embodiments thereof, it will be understood by those skilled in the art that various changes in form and details may be made therein without departing from the scope of the invention encompassed by the appended claims.

What is claimed is:

1. An audio echo canceller adjusted to provide an echo attenuated output signal from an echo added microphone signal consisting of a near-end audio signal and a far-end audio signal originated echo signal, said audio echo canceller comprising:

a first analyze filter configured to divide the far-end audio signal into a number of sub-band reference signals, a second analyze filter configured to divide the echo added microphone signal into a number of sub-band echo added microphone signals, a number of sub-band finite impulse response (FIR) filters including respective sets of sub-band filter taps, each sub-band FIR filter configured to filter an associated sub-band reference signal and output an inverted sub-band echo estimate being added to an associated sub-band echo added microphone signal to provide a sub-band echo attenuated feedback signal, with which an associated set of sub-band filter taps are updated, a first synthesize filter configured to merge corresponding sub-band filter taps from said sets of sub-band filter taps to corresponding full band filter taps being passed to a full band FIR filter, the full band FIR filter configured to generate an inverted echo estimate by filtering the far-end audio signal, the full band FIR filter including a set of full band filter taps, and an adder configured to add the inverted echo estimate to the echo added microphone signal, and to output the echo attenuated output signal.

2. The audio echo canceller according to claim 1, wherein said first synthesize filter is configured to merge corresponding sub-band filter taps of order 0-(m-1) to respective full band filter taps for the full band FIR filter generating an early part of the inverted echo estimate, that late sub-band echo estimates, respectively calculated from m-n order sub-band filter taps of associated sub-band FIR filters, are merged in a second synthesize filter to provide a late part of the inverted echo estimate, n is a number of taps in the first synthesize filter, and m is an integer between 1 and n.

3. The audio echo canceller according to claim 2, further comprising:

a delay adjustment unit configured to adjust a delay of said late part of the inverted echo estimate to a delay of said early part of the inverted echo estimate.

4. The audio echo canceller according to claim 1, further comprising:
a number of multiplexers, one for each sub-band, configured to consecutively select current corresponding sub-band filter taps from said sets of sub-band filter taps for being merged in said first synthesize filter.

5. A method in an audio echo canceller adjusted to provide an echo attenuated output signal from an echo added microphone signal consisting of a near-end audio signal and a far-end audio signal originated echo signal, said method comprising:
dividing the far-end audio signal into a number of sub-band reference signals in a first analyze filter,
dividing the echo added microphone signal into a number of sub-band echo added microphone signals in a second analyze filter,
generating an inverted sub-band echo estimate in each respective one of a number of sub-band finite impulse response (FIR) filters including respective sets of sub-band filter taps by filtering an associated sub-band reference signals,
respectively adding the inverted sub-band echo estimate to an associated sub-band echo added microphone signal to provide a sub-band echo attenuated feedback signal,
updating an associated set of sub-band filter taps with said sub-band echo attenuated feedback signal,
merging corresponding sub-band filter taps from said sets of sub-band filter taps to corresponding full band filter taps in a first synthesize filter,
passing corresponding full band filter taps to a full band FIR filter,
generating, at the full band FIR filter, an inverted echo estimate by filtering the far-end audio signal, the full band FIR filter including a set of full band filter taps,
adding, at the audio echo canceller, the invented echo estimate to the echo added microphone signal to output the echo attenuated output signal.

6. The method according to claim 5, wherein the merging further comprises:
merging only corresponding sub-band filter taps of order 0-(m-1) to respective full band filter taps for the full band FIR filter, generating an early part of the inverted echo estimate in the full band FIR filter, calculating respective late sub-band echo estimates from m-n order sub-band filter taps of associated sub-band FIR filters, and merging said late sub-band echo estimates in a second synthesize filter to provide a late part of the inverted echo estimate,
wherein n is a number of taps in the first synthesize filter, and m is an integer between 1 and n.

7. The method according to claim 6, further comprising:
adjusting a delay of said late part of the inverted echo estimate to a delay of said early part of the inverted echo estimate in a delay adjustment unit.

8. The method according to claim 5, further comprising:
consecutively selecting current corresponding sub-band filter taps in each sub-band from said sets of sub-band filter taps for being merged in said first synthesize filter.

* * * * *